Patented Jan. 18, 1927.

1,615,091

UNITED STATES PATENT OFFICE.

MARCEL LEVY, OF GENEVA, SWITZERLAND, ASSIGNOR TO THE INTERNATIONAL SUGAR AND ALCOHOL COMPANY LIMITED, OF LONDON, ENGLAND.

PROCESS FOR REMOVING COLORING MATTERS AND OTHER IMPURITIES FROM SOLUTIONS.

No Drawing. Application filed June 13, 1925, Serial No. 36,992, and in Germany June 26, 1924.

If substances containing cellulose, such as wood, straw, rice chaff and the like be treated in the cold with concentrated acids, as described, for example, in the United States Patents Nos. 1,511,786, 1,544,149 and 1,547,893, there remains, after the conversion into saccharine matter, of the cellulose contained in the initial materials, an insoluble residue which must be considered as technically pure lignin.

In the production of this lignin, for example, six parts of 40% hydrochloric acid are poured over one part of sawdust and after standing for several hours the solution is filtered and the lignin is the residue thus remaining after the separation of the cellulose of the wood by this process.

It has now been found that this residue, after being freed by washing from the adhering solution, possesses like animal or wood charcoal the property of decolorizing colored solutions. It was not to be expected that the residue referred to as lignin should act in this way since externally it has nothing in common with the decolorizing charcoals hitherto employed.

The decolorizing action of the residue is very strong. In many cases it decolorizes even more powerfully than equal quantities of animal charcoal or active wood charcoal. It is frequently sufficient to treat colored solutions with the lignin residue in the cold in order to obtain a practically complete decolorization. For example, on filtering the very dark colored solution of wood sugar obtained by the action as aforesaid of acid upon wood, through the remaining washed lignin residue a surprisingly great clarification of the solution is obtained.

A further example of the decolorization of liquids by means of lignin is afforded by the decolorization of red wine in the case of the manufacture of white wine-vinegar. Whilst adsorbent charcoal in this case decolorizes only partially and not without difficulty, decolorization with lignin is extraordinarily easy.

Lignin is, however, suitable not only for adsorbing coloring matters but also for freeing liquids from other impurities. For example, the waste liquors which remain after the fermentation of fruit juices and the distillation of alcohol contain pectins which are a great nuisance if the waste liquors are passed directly into the drain. It has been found that lignin is a good agent for purifying the waste liquors sufficiently to enable them to be passed to the drainage system, without detriment.

In general, it is advisable not to dry the lignin residue but to use it for decolorizing in the damp condition in which it is obtained after being washed. It may, however, be previously dried though it is then advisable to damp it before use.

It has been shown that it is sometimes of advantage if the solution to be decolorized does not react in a neutral manner. According to the nature of the solution, a better cleaning and a longer term of effectiveness may be frequently obtained if non-neutral solutions are used to work in, but the liquids are first rendered either slightly acid or slightly alkaline.

What I claim and desire to secure by Letters Patent of the United States is:—

1. Process for removing coloring matters and other impurities from solutions, which comprises treating the solutions with the lignin residue which remains when converting substances containing cellulose, by concentrated acids in the cold.

2. A process for removing coloring matters and other impurities from solutions which consists in treating the said solutions with the lignin residue that is obtained as the result of the action of acids upon substances containing cellulose, said lignin residue being in the moist state as it is left after washing.

3. A process for removing coloring matters and other impurities from solutions which consists in treating the said solutions with the lignin residue that is obtained as the result of the action of acids upon substances containing cellulose, said lignin residue prior to use being damped in the case where it is provided in the dry state.

4. Process according to claim 1, in which the solutions to be cleaned are treated in non-neutral condition.

5. Process according to claim 1, in which the solutions to be cleaned are rendered weakly acid.

Dr. MARCEL LEVY.